United States Patent
Brütt et al.

(10) Patent No.: US 12,441,314 B2
(45) Date of Patent: Oct. 14, 2025

(54) METHOD FOR CONTROLLING A CHANGE IN THE DIRECTION OF TRAVEL OF A WORKING VEHICLE BETWEEN FORWARD TRAVEL AND REARWARD TRAVEL OR VICE VERSA

(71) Applicant: ZF CV SYSTEMS GLOBAL GMBH, Bern (CH)

(72) Inventors: Mirko Brütt, Springe (DE); Michael Haverkamp, Hannover (DE); Jan Spremberg, Wennigsen (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 55 days.

(21) Appl. No.: 18/264,791

(22) PCT Filed: Jan. 31, 2022

(86) PCT No.: PCT/EP2022/052204
§ 371 (c)(1),
(2) Date: Aug. 9, 2023

(87) PCT Pub. No.: WO2022/171475
PCT Pub. Date: Aug. 18, 2022

(65) Prior Publication Data
US 2024/0051537 A1    Feb. 15, 2024

(30) Foreign Application Priority Data

Feb. 9, 2021  (DE) .................. 10 2021 102 940.6
Oct. 1, 2021  (DE) .................. 10 2021 125 481.7

(51) Int. Cl.
*B60W 30/18*   (2012.01)
*B60W 10/188*  (2012.01)
(Continued)

(52) U.S. Cl.
CPC .... *B60W 30/18045* (2013.01); *B60W 10/188* (2013.01); *B60W 30/146* (2013.01);
(Continued)

(58) Field of Classification Search
None
See application file for complete search history.

(56) References Cited

U.S. PATENT DOCUMENTS 3,742,685 A  *  7/1973  Lian .................. A01D 75/30
                                                    56/11.4
5,163,742 A     11/1992  Toepfer et al.
(Continued)

FOREIGN PATENT DOCUMENTS

DE   1926592        11/1970
DE   3606418 A1     9/1987
(Continued)

OTHER PUBLICATIONS

European Patent Office, International Search Report issued in International patent application No. PCT/EP2022/052204 (Apr. 13, 2022).

(Continued)

*Primary Examiner* — Wade Miles
*Assistant Examiner* — Arslan Azhar
(74) *Attorney, Agent, or Firm* — Finch & Maloney PLLC

(57) ABSTRACT

A method is disclosed for controlling a change in the direction of travel of a working vehicle between forward travel and rearward travel or vice versa. The working vehicle has an electronically controllable hydrostatic travel drive, a power-operated brake system with at least one electronically controllable brake circuit, and an electronic brake-control unit for controlling the travel drive and the brake circuit. While the vehicle is traveling in a first direction, a change in the direction of travel is triggered by a switchover of the
(Continued)

hydrostatic travel drive by means of an assigned manual operating element. To reduce the mechanical loading, the deceleration of the working vehicle can be assisted by automatically actuating the brakes of the electronically controllable brake circuit, where these brakes are actuated by being triggered by the switchover of the operating element and are released by the time the vehicle comes to a standstill.

14 Claims, 3 Drawing Sheets

(51) Int. Cl.
    *B60W 30/14*         (2006.01)
    *B60W 40/105*       (2012.01)

(52) U.S. Cl.
    CPC ..... *B60W 40/105* (2013.01); *B60W 2300/121* (2013.01); *B60W 2300/14* (2013.01); *B60W 2300/152* (2013.01); *B60W 2510/182* (2013.01); *B60W 2520/06* (2013.01)

(56) References Cited

U.S. PATENT DOCUMENTS

| | | | |
|---|---|---|---|
| 5,295,736 | A | 3/1994 | Brearley |
| 5,916,062 | A | 6/1999 | Siepker |
| 6,039,673 | A | 3/2000 | Mikami et al. |
| 6,047,545 | A | 4/2000 | Deininger |
| 6,076,350 | A | 6/2000 | Deininger |
| 6,302,227 | B1 | 10/2001 | Takemura et al. |
| 6,411,881 | B1 | 6/2002 | Thomas |
| 6,655,485 | B1 | 12/2003 | Ito et al. |
| 6,765,654 | B2 | 7/2004 | Asaka et al. |
| 6,782,961 | B1 | 8/2004 | Ishikawa et al. |
| 6,811,015 | B2 | 11/2004 | Tietze |
| 6,910,988 | B2 | 6/2005 | Carlsson |
| 7,097,021 | B2 | 8/2006 | Takamura et al. |
| 7,267,634 | B2 | 9/2007 | Nakagawa et al. |
| 7,316,283 | B2 | 1/2008 | Yamamoto et al. |
| 7,381,147 | B2 | 6/2008 | Hofler |
| 9,156,463 | B2 | 10/2015 | Legner |
| 9,481,345 | B2 | 11/2016 | Schneider et al. |
| 2001/0002245 | A1 | 5/2001 | Pagani et al. |
| 2002/0082136 | A1 | 6/2002 | Endo et al. |
| 2003/0109359 | A1 | 6/2003 | Eguchi et al. |
| 2004/0067818 | A1 | 4/2004 | Obermeier-Hartmann et al. |
| 2007/0270281 | A1 | 11/2007 | Inoue et al. |
| 2010/0094513 | A1 | 4/2010 | Mair |
| 2010/0114443 | A1 | 5/2010 | Terwart et al. |
| 2012/0150396 | A1 | 6/2012 | Ajimoto et al. |
| 2014/0080667 | A1 | 3/2014 | Legner |
| 2015/0307101 | A1 | 10/2015 | Ries et al. |
| 2017/0313240 | A1* | 11/2017 | Randolph .............. B62D 63/08 |
| 2021/0031752 | A1* | 2/2021 | Choi .................. B60W 40/103 |
| 2021/0070298 | A1* | 3/2021 | Itsui ................ B60W 30/18109 |

FOREIGN PATENT DOCUMENTS

| | | |
|---|---|---|
| DE | 4011850 A1 | 10/1990 |
| DE | 4112503 A1 | 10/1992 |
| DE | 4307002 A1 | 9/1994 |
| DE | 19519768 A1 | 12/1996 |
| DE | 19746090 A1 | 3/1999 |
| DE | 19941876 A1 | 4/2001 |
| DE | 10122823 A1 | 11/2002 |
| DE | 10145996 A1 | 4/2003 |
| DE | 10223296 A1 | 4/2003 |
| DE | 10241951 A1 | 3/2004 |
| DE | 20219282 U1 | 4/2004 |
| EP | 0582816 A1 | 2/1994 |
| EP | 1300279 A2 | 4/2003 |
| EP | 3315370 A1 | 5/2018 |
| GB | 2 275 761 A | 9/1994 |
| GB | 2315826 A * | 2/1998 ........... B60W 10/02 |
| WO | 2004/067312 A2 | 8/2004 |
| WO | 2011/112138 A1 | 9/2011 |

OTHER PUBLICATIONS

European Patent Office, Written Opinion issued in International patent application No. PCT/EP2022/052204 (Apr. 13, 2022).

German Patent Office, Search Report issued in German patent application No. 10 2021 102 940.6 (Sep. 13, 2021).

German Patent Office, Search Report issued in German patent application No. 10 2021 125 481.7 (Mar. 9, 2022).

\* cited by examiner

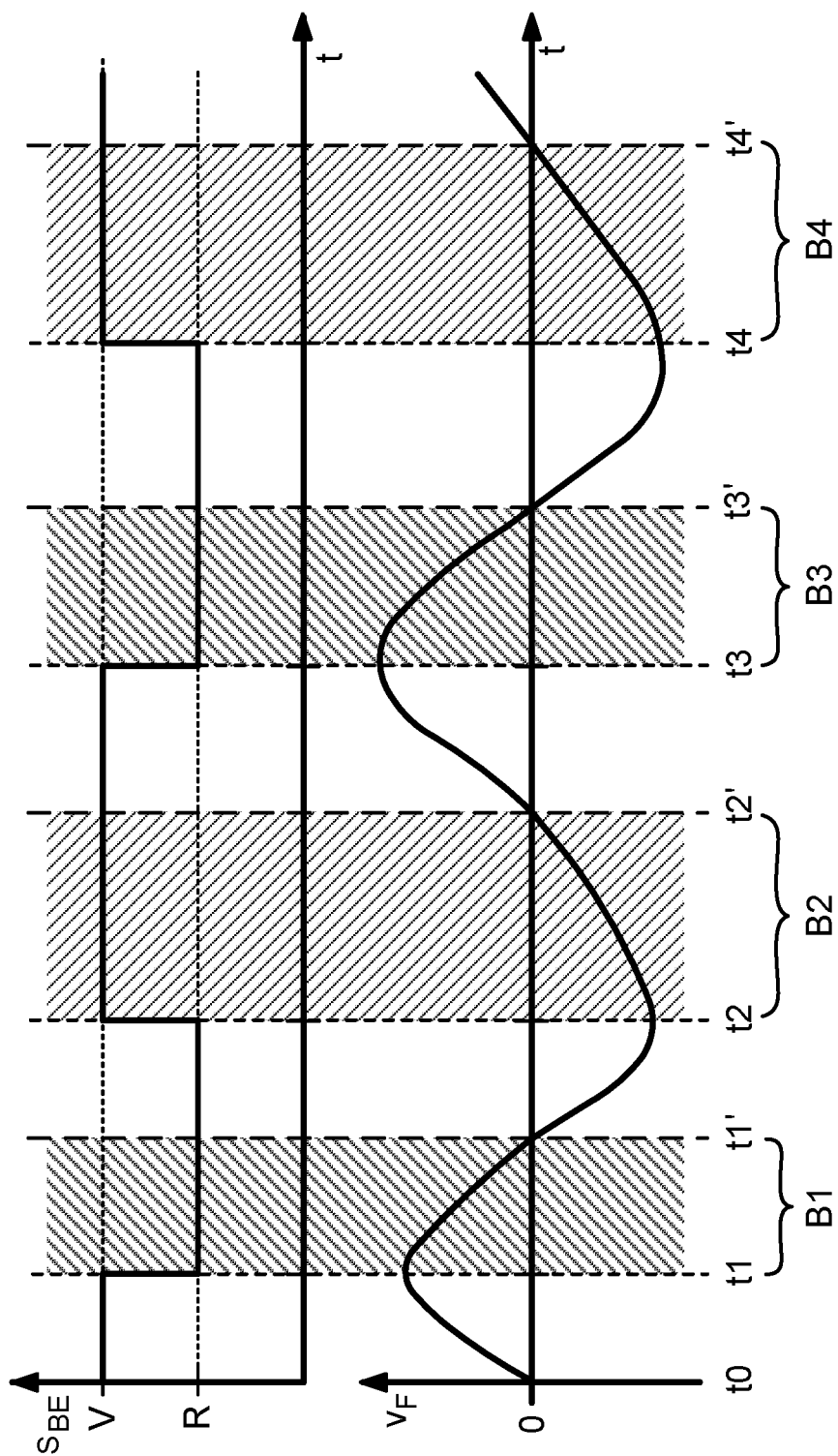

METHOD FOR CONTROLLING A CHANGE IN THE DIRECTION OF TRAVEL OF A WORKING VEHICLE BETWEEN FORWARD TRAVEL AND REARWARD TRAVEL OR VICE VERSA

RELATED APPLICATIONS

This application claims the benefit under 35 U.S.C. § 371 as a U.S. National Phase application of application no. PCT/EP2022/052204, filed on 31 Jan. 2022, which claims benefit of German Patent Application no. 10 2021 102 940.6 filed on 9 Feb. 2021, and German Patent Application no. 10 2021 125 481.7 filed on 1 Oct. 2021, the contents of which are hereby incorporated herein by reference in their entireties.

FIELD OF THE DISCLOSURE

The invention relates to a method for controlling a change in the direction of travel of a working vehicle between forward travel and rearward travel or vice versa, wherein the working vehicle has an electronically controllable hydrostatic travel drive, has a power-operated brake system with at least one electronically controllable brake circuit, and has an electronic brake-control unit for controlling the travel drive and also the at least one electronically controllable brake circuit of the brake system, and in which method, while the vehicle is traveling in a first direction of travel, a change in the direction of travel to the opposite direction of travel is triggered by a switchover of the hydrostatic travel drive by means of an assigned manual operating element.

BACKGROUND

A hydrostatic travel drive of a working vehicle, which can be a wheeled loader, a tractor, or a forklift, for example, has a hydrostatic drive train with at least one hydrostatic pump and a hydrostatic motor, which can be connected to one another in a closed or open fluidic circuit. At least the hydrostatic pump can be adjusted in such a way that its conveyance volume can be variably controlled. The hydrostatic travel drive can consist solely of the hydrostatic drive train (DE 101 45 996 A1) or can be formed, for example, from a power-splitting transmission with a hydrostatic drive train and a mechanical drive train (DE 101 22 823 B4) parallel thereto.

In the present case, it is assumed that a change in the direction of travel takes place, which is brought about by a switchover of the high-pressure lines and low-pressure lines leading to the hydrostatic motor, in the case of a closed circuit by a corresponding switchover of the hydrostatic pump or in the case of an open circuit by a switchover of a switching valve arranged between the hydrostatic pump and the hydrostatic motor.

In a working vehicle with such a hydrostatic travel drive and a loading shovel or loading fork arranged on the front of the vehicle, a change in the direction of travel can be triggered already while driving by switching an operating element, such as a direction-of-travel lever or a direction-of-travel switch, to the opposite direction. This can occur, for example, in the following situations: When receiving cargo at a loading position from forward travel to rearward travel, at a turning position with picked-up cargo in order to change from rearward travel to forward travel, and at an unloading position for unloading the previously picked-up cargo from forward travel to rearward travel.

The driver of a working vehicle must perform several tasks when loading cargo, for example steering the vehicle, pressing an accelerator and a brake pedal alternately, operating the levers for lifting and lowering as well as tilting the loading the shovel or loading fork while loading and unloading, and observing his or her surroundings in order to avoid collisions with other vehicles, people, and stationary obstacles. When the operating element is switched into the opposite direction of travel while the vehicle is in motion, the conveyance volume of the hydrostatic pump is first continuously reduced to zero and then increased again in the opposite conveyance direction or with a switched switchover valve. If the driver does not actively support the deceleration of the working vehicle by releasing the accelerator and pressing the brake pedal, but rather keeps his or her foot on the accelerator, the working vehicle is decelerated solely via the hydrostatic drive train, which is associated with a disadvantageously high mechanical loading of the relevant vehicle components. This loading is naturally higher in the loaded state than in the unloaded state of the working vehicle due to the higher prevailing vehicle mass.

SUMMARY

The present invention therefore addresses the problem of providing a method for controlling a change in the direction of travel of a working vehicle of this type between forward travel and rearward travel or vice versa, which can be used in order to reduce the mechanical loading of the components of the hydrostatic drive train in the mode of operation described.

This problem is solved by a method having the features of claim 1. Advantageous developments of this method are defined in the dependent claims.

Accordingly, the invention relates to a method for controlling a change in the direction of travel of a working vehicle between forward travel and rearward travel or vice versa, wherein the working vehicle has an electronically controllable hydrostatic travel drive, has a power-operated brake system with at least one electronically controllable brake circuit, and has an electronic brake-control unit for controlling the travel drive and also the at least one electronically controllable brake circuit of the brake system, and in which method, while the vehicle is traveling in a first direction of travel, a change in the direction of travel to the opposite direction of travel is triggered by a switchover of the hydrostatic travel drive by means of an assigned manual operating element.

In order to solve the problem described above, this method provides that, when the change in direction of travel from forward travel to rearward travel or vice versa is being carried out, the deceleration of the working vehicle is assisted by an automatic actuation of the brakes of the electronically controllable brake circuit of the brake system, wherein these brakes are actuated by being triggered by the switchover of the operating element and are released again at the latest when the vehicle comes to a standstill.

The invention proceeds from a working vehicle known per se, such as a wheeled loader, a tractor, or a forklift, which has an electronically controllable hydrostatic travel drive, a power-operated brake system with at least one electronically controllable brake circuit, and an electronic brake-control unit for controlling the travel drive and the electronically controllable brake circuit of the brake system.

If the driver of this vehicle switches the mentioned manual operating element while driving forwards or rearwards in order to trigger a change in the direction or travel in the opposite direction of travel, the conveyance volume of the hydrostatic pump in the hydrostatic drive train is first continuously reduced to the value zero and then increased again in the opposite conveyance direction or with a switched switchover valve. If the driver does not actively support the deceleration of the working machine by actuating the brake pedal, an undesirably high mechanical load arises in the components of the hydrostatic drive train.

The automatic braking of the working vehicle with the brakes of the electronically controllable brake circuit of the brake system supports and relieves the hydrostatic drive train when braking the working vehicle, so that the mechanical loading of the relevant components is reduced and the damage-free service life of the hydrostatic drive train is increased. The electronically controllable brake circuit of the brake system can, for example, actuate the brake actuators on the front axle, on the rear axle, or on both vehicle axles.

In order to dose the brake pressure $p_B$ fed into the brake cylinders of the electronically controllable brake circuit, it is provided, for example, that the driving speed of the working vehicle and at least one operating parameter characterizing the mechanical loading of the hydrostatic drive train are detected by sensors, and their values are transmitted to the brake-control unit, and that the brake pressure $p_B$ to be fed into the brake cylinders of the brakes of the electronically controllable brake circuit in the brake-control unit is determined as a function of the driving speed $v_F$ of the working vehicle and the value of the at least one operating parameter characterizing the mechanical loading of the hydrostatic drive train.

The input torque $M_{HA\_E}$, the output torque $M_{HA\_A}$, and the translation $i_{HA}$ of the hydrostatic drive train as well as the working pressure $p_A$ in a high-pressure line of the hydrostatic drive train can be used as the operating parameters characterizing the mechanical loading of the hydrostatic drive train.

Because an additional braking of the working vehicle by means of the brakes of the electronically controllable brake circuit only makes sense at a higher driving speed $v_F$, it can be provided that the brakes of the electronically controllable brake circuit are only actuated when the driving speed $v_F$ of the working vehicle has reached or exceeded $|v_F| \geq v_{F\_min}$ a predetermined minimum driving speed $v_{F\_min}$ at the time of the switchover of the operating element. This minimum driving speed $v_{F\_min}$ can be set to a value of 5 km/h, for example ($v_{F\_min}$=5 km/h).

Also, the premature release of the brakes before the vehicle comes to a standstill (vehicle speed $v_F$=0) can be sensible, because the brakes are usually released with a certain delay after the assigned brake cylinders have been depressurized. In order to prevent the subsequent acceleration of the working vehicle from being hindered by the brakes still being applied, it can therefore be provided that the brakes of the electronically controllable brake circuit are released even before the vehicle comes to a standstill ($v_F$=0) when the driving speed $v_F$ of the working vehicle has reached or fallen below a minimum driving speed $v_{F\_min^*}$ close to zero ($|v_F| \leq v_{F\_min^*}$). This minimum driving speed $v_{F\_min^*}$ can be set to a value of 0.5 km/h, for example ($v_{F\_min^*}$=0.5 km/h).

The brakes of the electronically controllable brake circuit are preferably also released as soon as the actuation of a foot brake valve is registered, wherein the brake pressure $p_B$ already fed into the respective brake cylinders is continuously converted into the brake pressure fed in via the foot brake valve or determined by means of a brake value encoder or travel range sensor arranged on the foot brake valve.

The level of the brake pressure $p_B$ fed into the brake cylinders of the electronically controllable brake circuit is determined, for example, proportionately to the driving speed $v_F$ of the working vehicle prevailing at the time of the switchover of the operating element, because the loading of the components of the hydrostatic drive train increases with the level of the driving speed w when the working vehicle is braked.

Additionally or alternatively, the level of the brake pressure $p_B$ fed into the brake cylinders of the electronically controllable brake circuit is determined proportionately to the input torque $M_{HA\_E}$ present at the time of the switchover of the operating element, the working pressure $p_A$ in a high-pressure line, and the output torque $M_{HA\_A}$ or the translation $i_{HA}$ of the hydrostatic drive train, which are characterizing for the loading of the components of the hydrostatic drive train.

The brake pressure $p_B$ fed into the brake cylinders of the electronically controllable brake circuit after switching over the operating element can be held constant until the brakes are released.

However, it is also possible for the brake pressure $p_B$ fed into the brake cylinders of the electronically controllable brake circuit after switching over the operating element to be lowered continuously, for example proportionately to the decreasing driving speed $v_F$, until the brakes are released.

A further possibility is that the brake pressure $p_B$ fed into the brake cylinders of the electronically controllable brake circuit after switching over the operating element is regulated in such a way that a specified braking deceleration $a_{F\_soll}$ is maintained.

The brake pressure in the brake cylinders of the electronically controllable brake circuit can be adjusted in different ways, depending on the design of the brake system of the working vehicle. The brake pressure $p_B$ in the brake cylinders of the electronically controllable brake circuit can be adjusted by means of an electronically controllable proportional valve, to which a pressurized supply line is connected on the input side and a main brake line leading to the brake cylinders is connected on the output side.

Alternatively, it can be provided that the brake pressure $p_B$ in the brake cylinders of the brakes of the electronically controllable brake circuit is set by means of a respective ABS control unit on each side of the vehicle. The ABS control units have inlet valves and outlet valves and are components of an anti-locking brake system, which is known per se. An ABS control unit enables an anti-locking braking process to be carried out on the vehicle wheels in a manner known per se. A section of a front axle brake line branching off from an axle brake line serving as the main brake line is connected to the two ABS control units on the input side. On the output side, a respective section of the front axle brake line leading to a brake cylinder of the assigned brake is connected to each of the two ABS control units.

In certain cases, the operation of vehicle combinations consisting of a towing vehicle and an attached trailing vehicle or trailer is associated with frequent changes in the direction of travel. For example, a tractor with an attached single-axle field sprayer must turn around at the end of a field with two changes in the direction of travel if it is not possible to leave the field for the turning maneuver due to bushes or trees, for example.

In order to avoid a buckling of the vehicle combination around a trailer hitch, it can be provided that, in a vehicle combination consisting of a towing vehicle and a trailer, only the brakes of at least one electronically controllable brake circuit of the brake system of the trailer, viewed in the direction of travel, are actuated. Accordingly, only the trailer is braked when the forward drive comes to an end, and only the towing vehicle is braked when the reverse drive comes to an end.

Alternatively, for the same purpose, it can be provided that, in the case of a vehicle combination consisting of a towing vehicle and a trailer, the brakes of at least one electronically controllable brake circuit of the brake system of the rear trailer in the prevailing direction of travel are actuated more strongly than the brakes of at least one electronically controllable brake circuit of the front vehicle in the direction of travel. Accordingly, during forward travel, the trailer is braked more strongly than the towing vehicle, and during rearward travel, the towing vehicle is braked more strongly than the trailer.

Finally, it can be provided that, after the manual operating element has been actuated, the brakes on the front axle or on the rear axle and/or on the front axle and on the rear axle of this vehicle are actuated electronically in order to support the deceleration of the working vehicle or the towing vehicle or the trailer. Accordingly, the wheels of the vehicle axle optimal in each case for the task at hand and the other operations of the vehicle can be braked depending on how the vehicle is constructed and/or operated.

BRIEF DESCRIPTION OF THE DRAWINGS

The invention is explained in further detail below with reference to an exemplary embodiment illustrated in the attached drawing. The drawing shows:

FIG. 2a: the switching state of a manual operating element of the working vehicle in the driving scenario shown in FIG. 1 in a time diagram, FIG. 2b: the driving speed and the direction of travel of the working vehicle in the driving scenario shown in FIG. 1 in a further time diagram.

DETAILED DESCRIPTION

Figure 1:
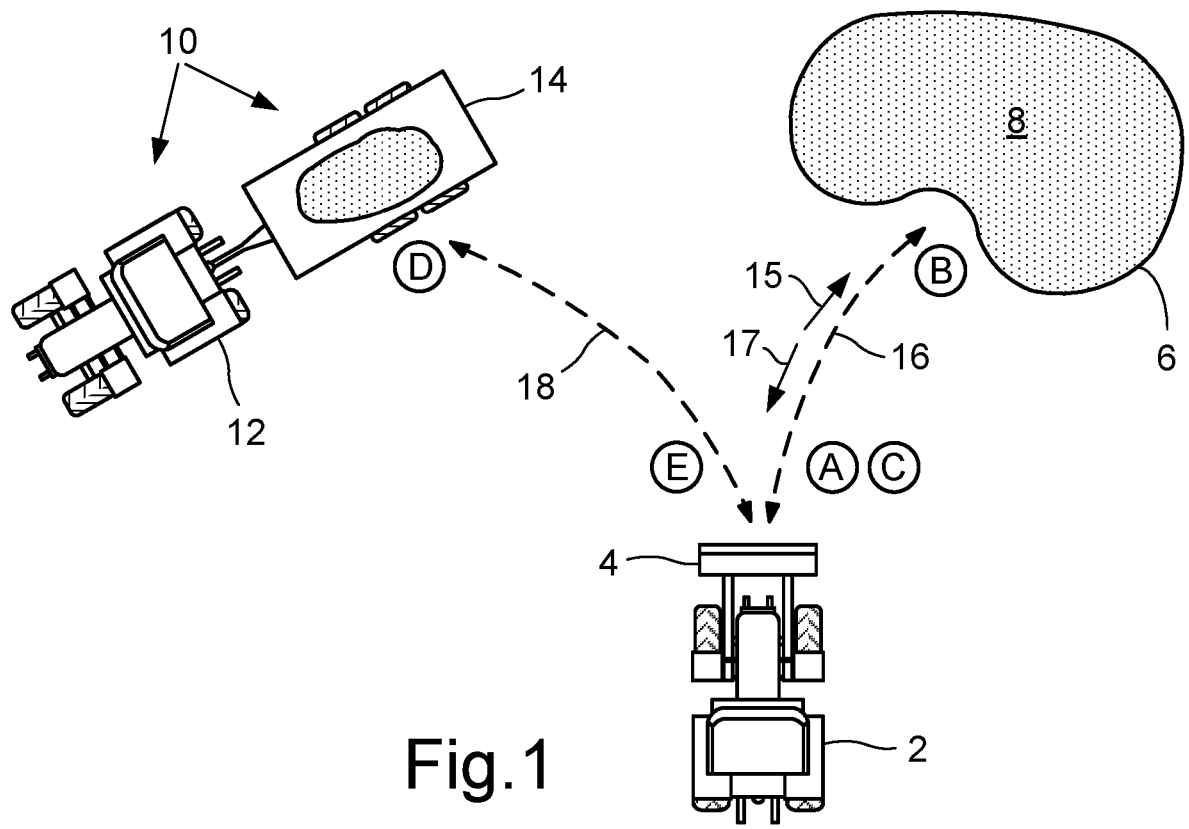
FIG. 1: a view from above of a loading zone on which a working vehicle loads a trailing vehicle of a towing vehicle with a cargo, wherein the method according to the invention for controlling a change in the direction of travel of the working vehicle from forward travel to rearward travel and vice versa is used.

The method according to the invention is used in order to control a change in direction of travel from forward travel to rearward travel or vice versa in a working vehicle 2 which has an electronically controllable hydrostatic travel drive 3, a power-operated brake system 22 with at least one electronically controllable brake circuit 106, and an electronic brake-control unit 40 for controlling the travel drive 3 and the electronically controllable brake circuit 106 of the brake system 22. This method is explained below by means of a driving scenario by way of example, which is shown in a plan view in FIG. 1.

A working vehicle 2, which in the present case is a tractor provided with a front loader shovel 4, is intended to pick up loose cargo 8 from a larger heap 6 and unload it onto the loading surface of a trailer 14 of a vehicle combination 10. In this example, the cargo 8 is sand, grain, or silage. The vehicle combination 10 consists of a further tractor 12 and the trailer 14 attached thereto.

In order to carry out this loading operation, the working vehicle 2 moves from a home position A on a first travel path 16 forwards into the loading position B, at which the heap 6 with the cargo 8 is located in order to pick up the cargo 8 with the front loader shovel 4. The working vehicle 2 then drives in reverse approximately along the first travel path 16 to the first turning position C, which is close to the home position A. From the first turning position C, the working vehicle 2 travels forward on a second travel path 18 to an unloading position D, which is located immediately adjacent the trailer 14. Once there, the front loader shovel 4 tips the cargo 8 it has picked up onto the loading surface of the trailer 14. Thereafter, the working vehicle 2 drives in reverse approximately along the second travel path 18 to a second turning position E, which is close to the home position A and the first turning position C. This driving cycle is repeated until the trailer 14 is sufficiently loaded with the cargo 8.

It can be seen that, at the loading position B and the unloading position D, there is a change in direction from forward travel to rearward travel, while at the two turning positions C, E there is a change in direction of travel from rearward travel to forward travel.

The mentioned change in direction can be triggered while driving by a corresponding actuation 69 of a manual operating element 70 (see FIG. 4), i.e., a direction-of-travel lever or a direction of travel switch, into the respective opposite direction. In the hydrostatic drive train 3.1, the conveyance volume of a hydrostatic pump (not shown) is first continuously reduced to the value zero or at least close to zero and then increased again in the opposite conveyance direction or with a switched switchover valve (also not shown). This causes an undesirably high mechanical loading of the components of the hydrostatic drive train 3.1 that are in action here.

The method according to the invention counteracts this in that the deceleration of the working vehicle 2 by means of the hydrostatic drive train 3.1 is supported by an automatic braking with the brakes 113a, 113b of at least one electronically controllable brake circuit 106 of the brake system 22. The involved wheel brakes 113a, 113b are actuated by the switchover 69 of the manual operating element 70 counter to the current forward direction of travel 15, V or reverse direction of travel 17, R and released again at the latest when the vehicle comes to a standstill ($v_F=0$). This is illustrated in the two diagrams in FIGS. 2a and 2b for the driving scenario shown in FIG. 1. In the first diagram according to FIG. 2a, the solid line shows the switching state $S_{BE}$ of the manual operating element 70 between forward travel V and rearward travel R over time t, while the diagram according to FIG. 2b shows the driving speed $v_F$ of working vehicle 2 during forward travel and rearward travel over time t.

As both FIGS. 2a and 2b illustrate in a combined view, the driving operation begins at the home position A according to FIG. 1 at timepoint t0 with an acceleration of working vehicle 2 in forward travel, wherein the mentioned manual operating element 70 is initially in the switch position $S_{BE}=V$ for forward travel.

At timepoint t1, the driver of the working vehicle 2 switches the manual operating element 70 into the switch position $S_{BE}=R$ for rearward travel. Then, in a first brake phase B1, the working vehicle 2 is braked by switching the hydrostatic travel drive 3 on the one hand and also by actuating the brakes 113a, 113b of the mentioned electronically controllable brake circuit 106 of brake system 22. At the latest when the vehicle comes to a standstill ($v_F$=0) at timepoint t1', which ideally coincides with reaching the loading position B, the brakes 113a, 113b of the electronically controllable brake circuit 106 are released again.

Thereafter, the working vehicle 2 is accelerated rearwards, as shown by the curve $v_F(t)$. At timepoint t2, the driver switches the manual operating element 70 into the switch position $S_{BE}$=V for forward travel. Then, in a second brake phase B2, the working vehicle 2 is braked by switching the hydrostatic drive train 3.1 on the one hand and also by actuating the brakes 113a, 113b of the electronically controllable brake circuit 106. At the latest when the vehicle comes to a standstill ($v_F$=0) at timepoint t2', which ideally coincides with reaching the first turning position C, the brakes 113a, 113b of the electronically controllable brake circuit 106 are released again.

Thereafter, the working vehicle 2 is accelerated forward. At time t3, the driver switches the manual operating element 70 into the switch position $S_{BE}$=R for rearward travel R. Then, in a third brake phase B3, the working vehicle 2 is braked by switching the hydrostatic drive train 3.1 on the one hand and also by actuating the brakes 113a, 113b of the electronically controllable brake circuit 106. At the latest when the vehicle comes to a standstill ($v_F$=0) at timepoint t3', which ideally coincides with reaching the unloading position D, the brakes 113a, 113b of the electronically controllable brake circuit 106 are released again.

The working vehicle 2 is subsequently accelerated rearwards. At timepoint t4, the driver switches the manual operating element 70 into the switch position $S_{BE}$=V for forward travel. Then, in a fourth brake phase B4, the working vehicle 2 is braked by switching the hydrostatic drive train 3.1 on the one hand and also by actuating the brakes 113a, 113b of the electronically controllable brake circuit 106. At the latest when the vehicle comes to a standstill ($v_F$=0) at timepoint t4', which ideally coincides with reaching the second turning position E, the brakes 113a, 113b of the electronically controllable brake circuit are released again.

Because the two turning positions C and E do not depend on maintaining the respective position exactly, the control of the method according to the invention in the two brake phases B2, B4 is unproblematic. By contrast, a largely exact maintenance of the loading position B and the unloading position D is required in order to allow the cargo 8 to be picked up at the loading position B and to allow the cargo 8 to be unloaded at the unloading position D, as well as to avoid a collision with the trailer 14 of the vehicle combination 10 close to the unloading position D. When approaching the loading position B and when approaching the unloading position D, a skilled driver is therefore required so that these two positions B and D can be reached largely exactly without the driver actuating the brake pedal and/or the accelerator.

Figure 3:
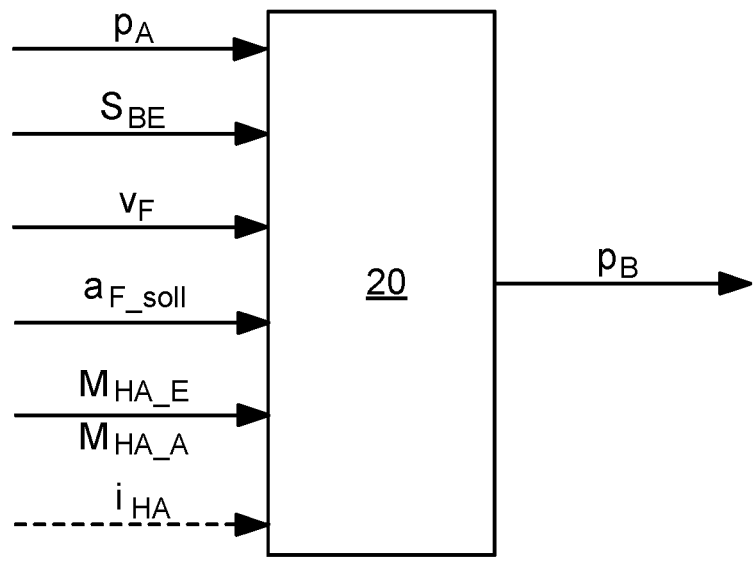
FIG. 3: the control of the braking operations in the driving scenario according to FIGS. 1, 2a, and 2b in a functional diagram.
Figure 4:
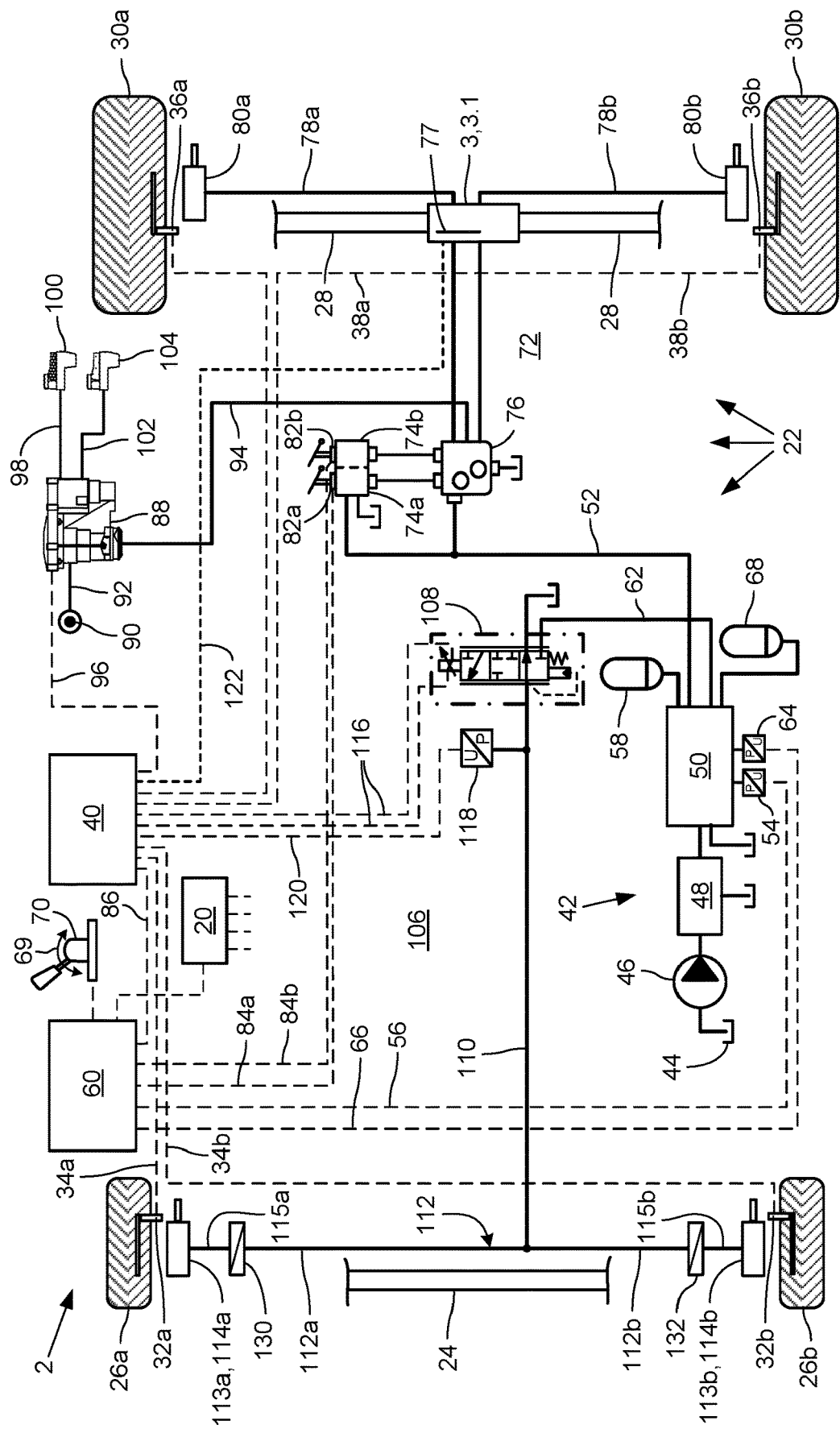
FIG. 4: a brake system of a working vehicle for using the method according to FIGS. 1 to 3 in a schematic illustration.

The functional diagram according to FIG. 3 shows the determination of the brake pressure $p_B$ introduced into the brake cylinders of the electronic brake circuit 106 of the brake system 22 in the four mentioned brake phases B1, B2, B3, B4 according to FIGS. 2a and 2b. Accordingly, the switch position $S_{BE}$ of the manual operating element 70, the driving speed $v_F$ of the working vehicle 2, the desired braking deceleration $a_{F\_soll}$ of the working vehicle 2, and the input torque $M_{HA\_E}$ and/or the output torque $M_{HA\_A}$ of the hydrostatic drive train 3.1 are measured by sensors and fed to an electronic control unit 20. These sensor data are processed in this control unit 20 and, with their help, the brake pressure $p_B$ to be fed into the brake cylinders 114a, 114b of the electronic brake circuit 106 is determined. This electronic control unit 20 can be part of a central electronic control unit 60, or it can be connected thereto via a data line, as shown in FIG. 4. The brake pressure $p_B$ thus fed in is then set either by means of an electronically controllable proportional valve or by means of the electronic ABS control units 130, 132.

Accordingly, according to FIG. 4, it can be provided that the brake pressure $p_B$ in the brake cylinders 114a, 114b of the two brakes 113a, 113b of the electronically controllable brake circuit 106 is set by means of ABS control units 130, 132. To these ABS control units 130, 132, a respective section 112a, 112b of a front axle brake line 112 branching off from an axle brake line 110 is connected on the input side, and a respective section 115a, 115b of the front axle brake line 112 leading to a brake cylinder 114a, 114b of the assigned brake 113a, 113b is connected on the output side.

As a further operating parameter for determining the brake pressure $p_B$ to be fed in, the working pressure $p_A$ can be measured by sensors in a high-pressure line 77 of the hydrostatic drive train 3.1 and transmitted to the control unit 20. Instead of measuring the output torque $M_{HA\_A}$ by means of sensors, the translation ii-IA of the hydrostatic drive train 3.1 can be measured by means of sensors and transmitted to the control unit 20, with which the output torque $M_{HA\_A}$ can be calculated from the input torque $M_{HA\_E}$.

In the schematic illustration of FIG. 4, a brake system 22, known per se, of a working vehicle 2 designed as a tractor is shown, in which the method according to the invention can be used. The working vehicle 2 has a non-driving front axle 24 with two front wheels 26a, 26b arranged on both sides and a rear axle 28 configured as a drive axle with two rear wheels 30a, 30b arranged on both sides. A wheel speed sensor 32a, 32b, 36a, 36b is arranged on each of the wheels 26a, 26b, 30a, 30b of the two vehicle axles 24, 26 and is connected to the electronic brake-control unit 40 via sensor lines 34a, 34b, 38a, 38b. The driving speed $v_F$ of the working vehicle 2 can be determined in the brake-control unit 40 from the sensor signals of the wheel speed sensors 32a, 32b, 36a, 35b.

The brake system 22 has a hydraulic primary brake system 72, a hydraulic secondary brake system configured as the electronically controllable brake circuit 106, and a pneumatic trailer control valve 88. A hydraulic pressure medium source 42 has an oil pump 46, from which hydraulic oil can be conveyed from a hydraulic reservoir 44 via a relay valve 48 into a hydraulic pressure medium concentration device 50. In the pressure medium concentration device 50, the delivered hydraulic oil is cleaned, cooled, and conducted to two supply lines 52, 62. An electrohydraulic pressure sensor 54, 64 and a respective hydraulic pressure reservoir 58, 68 are connected to each of the two supply lines 52, 62. The two pressure sensors 54, 64 are connected to a central electronic control unit 60 of the working vehicle 2 via electrical sensor lines 56, 66. A manually actuatable operating element 70 configured as a direction-of-travel lever is also connected to this control unit 60, by means of which the direction of travel of the working vehicle 2 can be selected.

The primary brake system 72 can be used as a service brake system and as a steering brake system and, in this example, has two brake circuits assigned to a respective side of the vehicle. The primary brake system 72 comprises the first supply line 52 with the assigned hydraulic first pressure reservoir 58, two foot brake valves 74a, 74b that can be actuated mechanically by the driver via a brake pedal, an axle relay valve 76, and two wheel brake lines 78a, 78b. The two foot brake valves 74a, 74b are connected to the first supply line 52 on the input side and to the axle relay valve 76 on the output side. The axle relay valve 76 is also connected to the supply line 52. The two wheel brake lines 78a, 78b are guided from the axle relay valve 76 to a respective rear brake cylinder 80a, 80b. The rear brake cylinders 80a, 80b are designed as active diaphragm or piston brake cylinders and are arranged on the wheel brakes of the rear wheels 30a, 30b, which are known per se and not shown here.

In the function as a service brake system, the brake pedals of the two foot brake valves 74a, 74b are mechanically coupled to one another, so that, when one of the two brake pedals is actuated, both assigned rear brake cylinders 80a, 80b are subjected to the same brake pressure synchronously, and, as a result, the working vehicle 2 is braked in a track-stable manner. In the function as a steering brake system, the brake pedals are mechanically disconnected, so that, when one of the brake pedals is actuated, only the assigned rear brake cylinder 80a, 80b is subjected to brake pressure, thereby supporting a cornering or turning maneuver of working vehicle 2 in the relevant direction.

The travel range of the assigned valve piston is measured by a travel range sensor 82a, 82b arranged on each of the two foot brake valves 74a, 74b and transmitted via an electrical sensor line 84a, 84b to the central control unit 60, in which a brake value signal can be formed from the respective travel signal. The central control unit 60 is connected to the brake-control unit 40 via a data bus 86, such as a CAN bus, for transmission of information. The brake-control unit 40 is also connected to the hydrostatic travel drive 3 via a control line 122 for controlling it.

The trailer control valve 88 is connected on the input side to a compressed air source 90 via a pneumatic supply line 92 and to the axle relay valve 76 of the primary brake system 72 via a hydraulic brake-control line 94. In addition, the trailer control valve 88 is connected to the brake-control unit 40 via an electrical control line 96.

In normal operation, the pneumatic supply pressure prevailing on the input side is reduced as required and passed through the trailer control valve 88 and guided on the output side via a pneumatic supply line 98 to a coupling head "Supply" (red) 100 of the working vehicle 2. In addition, depending on the brake pressure prevailing in the hydraulic brake-control line 94 and/or a control signal transmitted via the control line 96, a pneumatic brake-control pressure is set in the trailer control valve 88, which is guided via a brake-control line 102 to a coupling head "Brake" (yellow) 104 of the working vehicle 2. When a trailer 14 is coupled, its brake system 22, which is operated by compressed air, is supplied with the supply pressure prevailing at the coupling head "Supply" 100 and controlled as a function of the brake-control pressure prevailing at the coupling head "Brake" 104.

The secondary brake system, that is to say the electronic brake circuit 106, can be used at least as an auxiliary brake system, with which function the working vehicle 2 can be braked safely in the event of a failure of the primary brake system 72. The secondary brake system has only one electronically controllable brake circuit 106 and comprises the second supply line 62 with the assigned hydraulic second pressure reservoir 68, a brake-control valve 108, an axle brake line 110 that branches into two axle brake lines 112a, 112b and serves as the main brake line, and two front brake cylinders 114a, 114b, respectively connected to one of the two branched brake lines 112a, 112b. The two front brake cylinders 114a, 114b are designed as active membrane or piston brake cylinders and are arranged on the wheel brakes 113a, 113b of the front wheels 26a, 26b of the front axle 24, which are known per se and not shown in detail here.

The brake-control valve 108 is designed as a 3/3-way proportional solenoid valve with a pressure medium inlet, a pressure medium outlet, and a working terminal, by means of which the working terminal can be adjusted continuously between a connection with the pressure medium outlet and the pressure medium inlet. The pressure medium inlet is connected to the hydraulic pressure medium source 42 via the supply line 62, the pressure medium outlet is connected to an unpressurized hydraulic reservoir, and the working terminal is connected to the two front brake cylinders 114a, 114b via the aforementioned axle brake line 110 and the brake lines 112a, 112b branching off therefrom. By activating the brake-control valve 108 accordingly, the brake pressure $p_B$ present in axle brake line 110 and the front brake cylinders 114a, 114b connected thereto can be continuously adjusted between a minimum pressure corresponding to the ambient pressure and a maximum pressure corresponding to the supply pressure prevailing in the supply line 62.

The electromagnet of the brake-control valve 108 is connected to the brake-control unit 40 via an electrical control line 116 and can be controlled by the latter. The working terminal of the brake-control valve 108 is connected to the pressure medium outlet in the unpowered state and to the pressure medium inlet in an unthrottled manner in the maximum powered state. A third electrohydraulic pressure sensor 118 is connected to this axle brake line 110 for detecting and monitoring the brake pressure $p_B$ introduced into the axle brake line 110 via the brake-control valve 108, which is connected to the brake-control unit 40 via an electrical sensor line 120. The secondary brake system 106 can thus be controlled purely electronically. The brake pressure $p_B$ in the axle brake line 110 and the front brake cylinders 114a, 114b connected thereto can thus be adjusted independently of the primary brake system 72 as a function of a brake value signal, which can be determined in the brake-control unit 40 from the sensor signals of the travel range sensors 82a, 82b or in some other manner.

In order to use the present method, it is provided that the secondary brake system or the electronically controllable brake circuit 106 is used in order to mechanically relieve the hydrostatic drive train 3.1, in that, in the brake phases B1, B2, B3, B4, the brake-control valve 108 is actuated by the brake-control unit 40 in such a way that the two brake cylinders 114a, 114b on the front axle 24 according to FIG. 2 are each subjected to a brake pressure $p_B$, which was previously determined as a function of the driving speed $v_F$ of the working vehicle 2 and at least one operating parameter characterizing the mechanical loading of the hydrostatic drive train 3.1.

LIST OF REFERENCE NUMERALS

2 Working vehicle, tractor
3 Hydrostatic travel drive
3.1 Hydrostatic drive train
3a First rear drive axle
3b Second rear drive axle
4 Front loader shovel
6 Heap
8 Cargo
10 Vehicle combination 12 Towing vehicle, tractor, front subvehicle
14 Trailing vehicle, trailer, rear subvehicle
15 First direction of travel
16 First travel path
17 Second direction of travel
18 Second travel path
20 Electronic control unit
22 Power-operated brake system
24 Front axle
26a, 26b Front wheels
28 Rear axle, drive axle
30a, 30b Rear wheels
32a, 32b Wheel rotation sensors
34a, 34b Sensor lines
36a, 36b Wheel rotation sensors
38a, 38b Sensor lines
40 Brake-control unit, control unit for brakes and the travel drive
42 Hydraulic pressure medium source
44 Sump tank
46 Oil pump
48 Relay valve
50 Pressure medium concentration device
52 First supply line
54 First pressure sensor
56 Sensor line
58 First pressure reservoir
60 Central control unit
62 Second supply line
64 Second pressure sensor
66 Sensor line
68 Second pressure reservoir
69 Switchover of the operating element 70
70 Operating element, direction-of-travel lever
72 Primary brake system
74a, 74b Foot brake valves
76 Axle relay valve
77 High-pressure line of the hydrostatic drive train
78a, 78b Wheel brake lines on the rear axle
80a, 80b Two brake cylinders on the rear axle
82a, 82b Two brake value encoders or travel range sensors on the two foot brake valves
84a, 84b Sensor lines
86 Data bus, CAN bus
88 Trailer control valve
90 Compressed air source
92 Supply line (compressed air)
94 Brake control line (hydraulic)
96 Control line
98 Supply line (compressed air) for coupling head "Supply" (red)
100 Coupling head "Supply" (red)
102 Brake control line
104 Coupling head "Brake" (yellow)
106 Electronically controllable brake circuit; secondary brake system
108 Brake control valve
110 Axle brake line serving as the main brake line
112 Front axle brake line branching off from axle brake line 110
112a First section branching off from the front axle brake line 112
112b Second section branching off from the front axle brake line 112
113a First brake of the electronically controllable brake circuit 106
113b Second brake of the electronically controllable brake circuit 106
114a First brake cylinder of the electronically controllable brake circuit 106
114b Second brake cylinder of the electronically controllable brake circuit 106
115a Section of the front axle brake line 112 between the first ABS control unit 130 and the first brake cylinder 114a
115b Section of the front axle brake line 112 between the second ABS control unit 132 and the second brake cylinder 114b
116 Control line
118 Third pressure sensor
120 Sensor line
122 Control line for the travel drive
130 First ABS control unit with inlet valve and outlet valve
132 Second ABS control unit with inlet valve and outlet valve
$a_{F\_soll}$ Operating parameter, target brake deceleration
A Home position
B Loading position
B1 First brake phase
B2 Second brake phase
B3 Third brake phase
B4 Fourth brake phase
C First turning position
D Unloading position
E Second turning position
$i_{HA}$ Operating parameter, translation
$M_{HA\_A}$ Operating parameter, output torque
$M_{HA\_E}$ Operating parameter, input torque
$p_A$ Operating parameter, working pressure
$p_B$ Brake pressure
R Reverse drive
$S_{BE}$ Operating parameter, switch position
t Time
t0 Timepoint
t1, t1' Timepoints
t2, t2' Timepoints
t3, t3' Timepoints
t4, t4' Timepoints
$v_F$ Driving speed
$v_{F\_min}$ Minimum driving speed
$v_{F\_min^*}$ Minimum driving speed
V Forward drive

The invention claimed is:

1. A method for controlling a change in a direction of travel of a working vehicle between forward travel and rearward travel or vice versa, wherein the working vehicle has an electronically controllable hydrostatic drive, has a power-operated brake system with at least one electronically controllable brake circuit, and has an electronic brake-control unit for controlling the hydrostatic drive and for controlling the at least one electronically controllable brake circuit of the brake system, the method comprising:

triggering, by a switchover of the hydrostatic drive by means of an assigned manual operating element and while the work vehicle is traveling in a first direction of travel, the change in the direction of travel from the first direction of travel to an opposite second direction of travel;

automatically actuating the brakes, by the electronically controllable brake circuit of the brake system, thereby assisting the deceleration of the working vehicle, wherein automatically actuating the brakes includes triggering actuation by the switchover using the operating element;
releasing the brakes no later than when the working vehicle comes to a standstill;
detecting, by a sensor, a driving speed of the working vehicle;
detecting, by a sensor, at least one operating parameter, characterizing a mechanical loading of a hydrostatic drive train of the hydrostatic drive;
transmitting the driving speed and the at least one operating parameter to the electronic brake-control unit; and
determining, as a function of the driving speed of the working vehicleand the value of the at least one operating parameter, a brake pressure to be fed into the brake cylinders of the brakes of the electronically controllable brake circuit in the brake-control unit.

2. The method according to claim 1, wherein automatically actuating the brakes of the electronically controllable brake circuit is performed only when the driving speed of the working vehicle has reached or exceeded a predetermined minimum driving speed at the time of the switchover of the operating element.

3. The method according to claim 1, wherein releasing the brakes occurs before the working vehicle comes to the standstill and when the driving speed of the working vehicle has reached or fallen below a minimum driving speed close to zero.

4. The method according to claim 1, further comprising:
registering an actuation of a foot brake valve;
releasing the brakes of the electronically controllable brake circuit upon registering the actuation of the foot brake valve; and
continuously converting the brake pressure fed into the respective brake cylinders to a brake pressure fed in via the foot brake valve or determining by means of a brake value encoder or travel range sensor arranged on the foot brake valve.

5. The method according to claim 1, wherein determining the brake pressure fed into the brake cylinders of the electronically controllable brake circuit is determined proportionately to the driving speed of the working vehicle at the time of the switchover of the operating element.

6. The method according to claim 5, comprising maintaining the brake pressure fed into the brake cylinders of the electronically controllable brake circuit after the switchover of the operating element until the release of the brakes.

7. The method according to claim 5, comprising reducing continuously the brake pressure fed into the brake cylinders of the brakes of the electronically controllable brake circuit after the switchover of the operating element until the release of the brakes.

8. The method according to claim 5, comprising maintaining a specified brake deceleration by regulating the brake pressure fed into the brake cylinders of the electronically controllable brake circuit after the switchover of the operating element.

9. The method according to claim 1, wherein determining the brake pressure fed into the brake cylinders of the electronically controllable brake circuit is determined proportionately to an input torque present at the time of the switchover of the operating element, a working pressure in a high-pressure line, and an output torque or the translation of the hydrostatic drive train.

10. The method according to claim 1, comprising setting the brake pressure in the brake cylinders of the electronically controllable brake circuit by means of an electronically controllable proportional valve to which a pressurized supply line is connected on an input side thereof and a main brake line leading to the brake cylinders is connected on an output side thereof.

11. The method according to claim 1, comprising setting, by means of ABS control units, the brake pressure in the brake cylinders of the brakes of the electronically controllable brake circuit to which a respective section of a front axle brake line branching off from an axle brake line is connected on an input side thereof and a respective section of the front axle brake line leading to a brake cylinder of the assigned brake is connected on an output side thereof.

12. A method for controlling a change in a direction of travel of a working vehicle between forward travel and rearward travel or vice versa, wherein the working vehicle has an electronically controllable hydrostatic drive, a power-operated brake system with at least one electronically controllable brake circuit, and an electronic brake-control unit for controlling the hydrostatic drive and for controlling the at least one electronically controllable brake circuit, the method comprising:
triggering, by a switchover of the hydrostatic drive by means of an assigned manual operating element and while the work vehicle is traveling in a first direction of travel, the change in the direction of travel from the first direction of travel to an opposite second direction of travel;
automatically actuating brakes, by the at least one electronically controllable brake circuit, thereby assisting the deceleration of the working vehicle, wherein automatically actuating the brakes includes triggering actuation by the switchover using the operating element; and
releasing the brakes no later than when the working vehicle comes to a standstill;
wherein the working vehicle comprises a vehicle combination consisting of a towing subvehicle and a trailing subvehicle, and wherein automatically actuating the brakes is performed by actuating the brakes of only rearward one of the towing subvehicle and the trailing vehicle with respect to the direction of travel.

13. A method for controlling a change in a direction of travel of a working vehicle between forward travel and rearward travel or vice versa, wherein the working vehicle has an electronically controllable hydrostatic drive, a power-operated brake system with at least one electronically controllable brake circuit, and an electronic brake-control unit for controlling the hydrostatic drive and for controlling the at least one electronically controllable brake circuit, the method comprising:
triggering, by a switchover of the hydrostatic drive by means of an assigned manual operating element and while the work vehicle is traveling in a first direction of travel, the change in the direction of travel from the first direction of travel to an opposite second direction of travel;
automatically actuating brakes, by the at least one electronically controllable brake circuit, thereby assisting the deceleration of the working vehicle, wherein automatically actuating the brakes includes triggering actuation by the switchover using the operating element; and
releasing the brakes no later than when the working vehicle comes to a standstill;
wherein the working vehicle further comprises a vehicle combination consisting of a towing subvehicle and a trailing subvehicle, and wherein automatically actuating the brakes is performed by actuating the brakes more strongly of at least one electronically controllable brake circuit of the brake system of a rearward one of the towing subvehicle and the trailing vehicle with respect to the direction of travel, compared to the brakes of at least one electronically controllable brake circuit of a forward one of the towing subvehicle and the trailing vehicle with respect to the direction of travel.

14. The method according to claim 1, wherein, after the actuation of the manual operating element for supporting the deceleration of the working vehicle or a towing subvehicle or the trailing subvehicle, automatically actuating the brakes includes actuating the brakes on a front axle or on a rear axle and/or on the front axle and on the rear axle of this vehicle in an electronically controlled manner.

\* \* \* \* \*